US006234489B1

(12) United States Patent
Orlowski et al.

(10) Patent No.: US 6,234,489 B1
(45) Date of Patent: May 22, 2001

(54) BEARING ISOLATOR

(75) Inventors: David C. Orlowski, Rock Island; Thomas D. Coe, Milan, both of IL (US)

(73) Assignee: IsoTech of Illinois, Inc., Rock Island, IL (US)

( * ) Notice: Subject to any disclaimer, the term of this patent is extended or adjusted under 35 U.S.C. 154(b) by 0 days.

(21) Appl. No.: 09/245,515

(22) Filed: Feb. 5, 1999

(51) Int. Cl.[7] .................................................. F16J 15/38
(52) U.S. Cl. ............................................. 277/395; 277/412
(58) Field of Search .................................. 277/347, 353, 277/412, 413, 418, 419, 420, 394, 395, 430

(56) References Cited

U.S. PATENT DOCUMENTS

| | | | |
|---|---|---|---|
| 3,739,528 | * | 6/1973 | Robillard et al. . |
| 4,304,409 | * | 12/1981 | Orlowski . |
| 4,645,213 | * | 2/1987 | Washimi et al. ................. 277/430 X |
| 4,989,883 | * | 2/1991 | Orlowski . |
| 5,335,921 | * | 8/1994 | Orlowski . |
| 5,498,006 | * | 3/1996 | Orlowski . |
| 6,017,037 | * | 1/2000 | Fedorovich ....................... 277/430 X |

FOREIGN PATENT DOCUMENTS 63-213551 * 9/1988 (JP) .

* cited by examiner

Primary Examiner—Anthony Knight
Assistant Examiner—Karlena D. Schwing
(74) Attorney, Agent, or Firm—Rockey, Milnamow & Katz, Ltd.

(57) ABSTRACT

A combination of bearing isolator, shaft, and housing with a stator member affixed to said housing, said stator member having a cavity member therein, an annular rotor member rotatively connected to and surrounding said shaft, said stator member substantially encompassing said rotor member, an insert filling said cavity in said stator member and in contact with said stator member and said rotor member, said insert having an axial cavity therein with the radial sides of the cavity in contact with radial sides of the rotor member and the stator member.

19 Claims, 1 Drawing Sheet

BEARING ISOLATOR

BACKGROUND OF THE INVENTION

This invention relates generally to shaft sealing devices for use of rotating equipment. Proper maintenance of rotating equipment is difficult to obtain because of the extreme equipment duty cycles, the lessening service factors, the design of the equipment and the lack of spare rotating equipment in may processing plants.

Various form of shaft sealing devices have been utilized to attempt to protect the integrity of the bearing environment, including rubber lip seals, clearance labyrinth seals and attraction magnetic seals. Lip seals or O-ring shaft seals can quickly wear out and fail. These seals are also known to permit excessive amounts of moisture and other contaminants into the oil reservoir of the operating equipment, precipitating failure.

Labyrinth-type seals involve closely related stator and rotor rings, which do not contact each other, but define labyrinth passages between them, having been devised and utilized and are illustrated in Orlowski, U.S. Pat. Nos. 4,706,968; 4,989,883; 5,069,461 and the additional patents to Orlowski cited therein. As described in Orlowski U.S. Pat. Nos. 4,989,883 and 5,069,461, improvements in labyrinth seals are disclosed and claimed including the utilization of various forms of O-ring seals to improve the static sealing action when the shaft is at rest, and non-contact dynamic sealing action is provided when the shaft is rotating.

In addition, an improvement in the case of oil mist lubrication, a coalescing ring is disclosed and claimed in Orlowski U.S. Patent application Ser. No. 08/882,123. This coalescing ring was located so as to contract a second rotor with an angle on its profile in a vertical plane away from the shaft. A coalescing ring adjacent to the shaft was disclosed by Orlowski's U.S. Patent application Ser. No. 08/701,815. This second rotor has an ever-increasing diameter and tends to impel the coalesced lubricating oil back toward the equipment where it can be controlled.

In many situations and applications the rotating shafts are partially flooded with lubricant prior to or while running.

Such is the case with nearly all gearboxes, where a pool of lubricant must be present to ensure that the bearings are not rotated without an adequate supply of lubricant covering their lower components. Oil mist lubrication as described in the references also poses as another unique problem. The mist that does not impinge on the bearing surfaces or is not coalesced, it is able to enter the environment outside the bearing enclosure. Sometimes notched lip seals provide an escape route and sometimes the spent mist is directed through pipes that convey the mist to recovery, or in some instances, the mist may be coalesced and returned to the pump. This present invention is designed and functions to prevent the escape of oil or lubricant in these difficult lubrication situations i.e., the flooded or partially flooded oil mist lubrication systems.

An object of the present invention is to provide a seal around a rotating shaft, and between the shaft and the housing, to prevent leakage of lubricant from the housing, and also prevent the entry of contaminants into the housing by the use of a lubricous insert in the stator, which combined with a elongation of the rotor provides total and absolute sealing i.e., prevents leaking of the lubricant outside the housing and simultaneously prevents the entrance of the contaminants into the bearing.

Prior art sealing mechanisms utilizing labyrinth seals have provided adequate sealing in many of the normal positions and levels of lubricants. This invention provides a novel seal, which provides no forced lubricant in or out of the bearing housing and likewise contaminants. Prior art seals force lubricant and contaminants either in or out of the housing, depending on the direction of rotation of the spiral tool marks on the hard surface of the rotor. In addition, because the normal bearing sealing surface is softer than the rotating portion or rotor of the seal, grooves must be reformed after axial movement of the shaft. This invention removes the spiral groove normally formed on the rotor-sleeve, which tends to constantly and continually abrade the seal to sleeve interface when the shaft is running.

This invention provides an insert into the stator, which forms a sealing surface, which will rotate against a portion of a rotor rather than against the shaft. This lack of contact with the shaft prevents damage to the shaft from the wear and tear of the sealing material. Another advantage to utilizing the seal insert into the stator is that it provides a means for changing out of the installation of the sealing material either at the manufacturer or into existing machinery in the field.

Another advantage of this invention is the novel machining of the surface of the rotor, sleeve or axial elongation of the rotor, which provides finely or precisely contoured parallel circular asperities or disk like profiles on the rotor sleeve surface that either lead into or out of the bearing housing. This novel machining provides a plurality of parallel disks with a plurality of circular grooves between the disks, although microscopic in size, are all essentially the same size, shape and have equal spacing so that any axial movement of the shaft and or the rotor will reposition the shaft or rotor interface over a new set of identical grooves.

Grinding of the surface of the rotor sleeve will produce an extremely smooth and amorphous finish, but will produce hydroplaning of the sealing components which will permit the movement of the oil out of and away from the bearing.

Thus this novel bearing isolator operates to provide a rotor that encompasses a larger portion of the shaft and also protects the shaft. Total restriction or sealing of the housing and the lubricant therein to the exterior is attained. This bearing isolator has been tested in the laboratory and has run over a thousand hours without a single drop of lubricant leaking to the exterior.

This invention also requires accomplishing improved sealing providing a unique energizing ring positioned in the sealing material that have been inserted into the stator. This ring maintains a constant pressure between the inserted sealing material and the rotor.

Other object advantages and embodiments of the invention will become apparent upon reading the following detailed description upon reference to the drawings and the prior art patents.

This invention provides total sealing regardless of the direction of the rotation of the shaft as contrasted to the prior art to which is due to the manner of machining of spiral grooves in the surface of the rotor. This machined grooves act as a screw to drive the lubricant either in or out of the housing, depending upon the direction of rotation verses the direction of the screw surface which has been machined into the rotor.

DETAILED DESCRIPTION OF THE PERFERRED EMBODIMENT OF THE INVENTION

Figure 1:
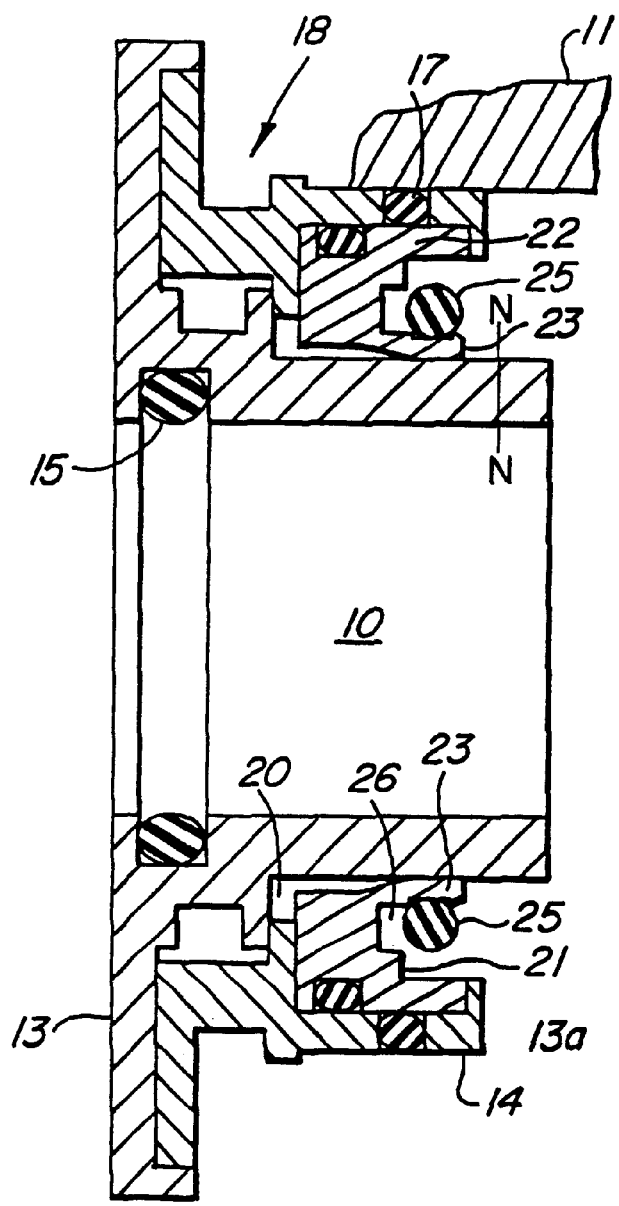
FIG. 1 is a sectional view showing the improved sealing structure with a shaft.
Figure 2:
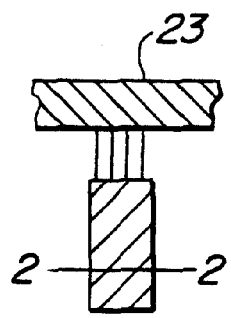
FIG. 2 is a cross sectional view of 2—2.

FIG. 1 shows the bearing isolator 18 including the novel seal mechanism mounted on a shaft 10. The shaft 10 protrudes through the isolator 18 and the housing 11. The novel isolator of this invention is shown with the stator 14 and the seal 17 holding the isolator 18 in position. The rotor 13 is affixed to the shaft by means of a frictional seal 15. The rotor 13 follows the rotational movement of the shaft 10 because of the frictional engagement of the seal 15. The labyrinths and passages are as shown but will not be described in detail herein because such description is readily understood by one skilled in the art.

The novelty of this invention includes the formation of a cavity or recess in the stator. This recess 20 is formed as a total cavity between the stator 14 and the rotor 13. One side of the cavity faces the stator 14 and the other side faces the rotor 13. The insert 21 fitted into cavity 20 is normally made of relatively soft reinforced PTFE or Teflon tm. This sealing insert 21 is fitted over and around the rotor sleeve 13a which may be considered an elongation of a normal rotor.

The insert normally has an interference of 0.050 inches or greater, with the rotor sleeve. The insert is machined or worn by the relatively hard rotor sleeve or elongation 13a so that the insert 21 precisely assumes the contour of the circular grooves of the rotor sleeve 13a. These circular grooves are microscopic in dimension and form (not shown) what are in effect in reality parallel disks. These parallel disks or microscopic grooves perfectly seal by wear between the disks and the corresponding grooves at the interface of the insert 21 and the elongated sleeve 13a.

The insert 21 has a cavity 22 in it and the portion of the insert 21 adjacent the elongated or sleeve of the rotor 13a has a thickness that it is able to be flexed and tightly fitted to a substantial portion of the surface rotor sleeve 13a. This lip 23 of the insert is held in position by a unique energizing ring of elastomeric material 25. The ring 25 is positioned into a receptor groove 26 that is machined into the insert 21 in the lip 23 to hold, with constant force, the insert to sleeve interface. The sealing insert may be machined from any reinforced PTFE compound that also should contain one or more of carbon particles, carbon in graphite form, carbon in coke form, glass, mica or other reinforcing materials. The PTFE is by nature lubricous and remains lubricous even when compounded with such materials as mentioned above in its many forms.

The stator insert 21 is replaceable and not part of the seal housing structure. This provides the ability to replace only a portion of the isolator, which replacement has not been possible before. The energizing ring 25 compensates for any wear of the insert 21 or the lip 23 of the insert 21 by the sleeve 13a so that continued dimensional stability and integrity of the seal is maintained. The energizing ring 25 may be made of Viton, nitrile, or any other suitable elastomer and is an O-ring in form. Viton is manufactured by DuPont.

The entire rotor 13 should be made of wear resistant material. It may be made of 416 stainless steel although it could be made of other bard metals and materials including ceramics of some formulations. If ceramic material is utilized the rotor and sleeve must be plunged machined as explained herein prior to firing the ceramics.

The present invention eliminates the problems encountered with shafts or sleeves machined with usual cutting tools in conventional fashion i.e., the surfaces are unidirectional in a spiral formation. The spiral tool marks act as a screw. The rotor sleeve at the contact point with the sealing material will screw or pump lubricant in or out of the bearing housing depending on direction of rotation and direction of the spiral cut. In addition, this spiral groove which in the rotorsleeve 13a will tend to constantly and continually abrade any seal to sleeve interface from insert 21 when the shaft 10 is running.

Grinding of the surface of the rotor sleeve 13a will produce an extremely smooth and amorphous finish with no inherent directional path, but such a glass like surface will produce hydroplaning of the sealing components and permit movement of the oil past the seal.

One novel aspect of the present invention that eliminates this problem of the screw or pumping action is that the finish machining is done by a perpendicular plunge machining of the rotor 13 or rotor sleeve 13a. The final machining process performed on the surface 13a of rotor sleeve or elongation portion of the rotor 13 is done by a plunge tool with a square end. This tool is precisely positioned on the rotor by a computer driven machine tool to affect the final finish of the rotor sleeve surface 13a. This is the outer radial surface of the rotor 13 away from the shaft 10. This machining results in a plurality of precisely contoured parallel circular asperities or disk like profiles. This forms a plurality of parallel disks on the surface 13a of the rotor sleeve that are circular and neither lead into or out of the bearing housing. All the microscopic circular grooves are disk like with essentially the same size, shape and spacing between each other so that axial movement of the shaft will reposition the shaft with the relation to insert 22 so that the interface is a new and identical set of grooves.

In addition, the interface between the rotor sleeve 13a and the stator insert face 22 will eliminate and prevent the intrusion of contaminants into the bearing housing. This rejection is accomplished by the same circular grooves in the rotor sleeve.

Because these inserts are replaceable, in case of wear, they may be replaced without replacing the remainder of the seal, this results in saving of cost and material. The stator, rotor insert combination may be assembled and shipped as a package for installation into bearing housings.

It is believed that one other thing accounts for the successful operation of this seal. Thus theory is a hydraulic damming effect produced by the oil trapped in the circular grooves of the rotor in the corresponding mirror image of the grooves in the stator insert. The trapped oil has a greater pressure than the kinetic energy in the static head in the bearing enclosure as the static head attempts to axially traverse the rotor stator insert interface along the outside diameter of rotor sleeve 13a. During testing of this novel seal it was noted that the interior was wetted by oil while the exterior of the seal was dry. This trapping or damming effect was more prevalent when surface speeds were increased during the testing.

Variations and other aspects of the preferred embodiment will occur to those versed in the art all without departure from the spirit and scope of the invention.

What is claimed is:

1. A combination of bearing isolator, shaft and housing comprising:
   a) said shaft extending through said housing;
   b) a stator member affixed to said housing;
   c) said stator member having a cavity therein;
   d) an annular rotor member, said rotor member rotatively connected to and surrounding said shaft;

e) said stator member substantially encompassing said rotor member;

f) an insert filling said cavity in said stator member and in contact with said stator member and said rotor member;

g) said insert having an axial cavity therein with the radial sides of the cavity in contact with radial sides of the rotor member and the stator member;

h) an annular resilient member;

i) said annular resilient member inserted in said cavity in said insert to hold one side of said insert in firm contact with outer radial the surface of said rotor whereby said housing is sealed from the external environment.

2. The invention as set forth in claim 1, wherein said surface of said rotor in contact with said insert is a series of parallel disks.

3. The invention as set forth in claim 2, wherein said insert is machined from lubricous material.

4. The invention as set forth in claim 3, wherein said lubricous material contains reinforcing material.

5. The invention as set forth in claim 4, wherein said reinforcing material is carbon.

6. The invention as set forth in claim 4, wherein said reinforcing material is glass.

7. The invention as set forth in claim 2, wherein said resilient member is an O-ring.

8. The invention as set forth in claim 2, wherein said rotor surface abrades the surface of said insert to conform to the circular grooved asperities of said surface of said rotor.

9. The invention as set forth in claim 2, wherein said circular grooved asperities are essentially the same size, shape and spacing, whereby any axial movement of said shaft retains identical seal characteristics.

10. The invention as set forth in claim 9, wherein the surface of the disks on the said rotor form a plurality of equally spaced circular grooves.

11. The invention as set forth in claim 1, wherein said insert is machined from lubricous material.

12. The invention as set forth in claim 11, wherein said lubricous material contains reinforcing material.

13. The invention as set forth in claim 12, wherein the reinforcing material is carbon.

14. The invention as set forth in claim 12, wherein the reinforcing material is glass.

15. The invention as set forth in claim 1, wherein said resilient member is an O-ring.

16. The invention as set forth in claim 1, wherein said rotor member is axially elongated and encompasses said shaft.

17. The invention as set forth in claim 16, wherein said rotor member is a hard machineable material machined with circular grooved asperities.

18. The invention as set forth in claim 15, wherein said rotor member is steel.

19. The invention as set forth in claim 18, wherein said circular grooved asperities are essentially the same size and shape, whereby any axial movement of said shaft retains identical seal characteristics.

* * * * *